May 3, 1949.  J. R. DOMBROWIAK  2,469,159
PASSENGER ESCAPE FOR VEHICLES

Filed May 17, 1946  3 Sheets-Sheet 1

INVENTOR.
JOSEPH R. DOMBROWIAK
BY
ATTORNEY

May 3, 1949.   J. R. DOMBROWIAK   2,469,159
PASSENGER ESCAPE FOR VEHICLES
Filed May 17, 1946   3 Sheets-Sheet 2
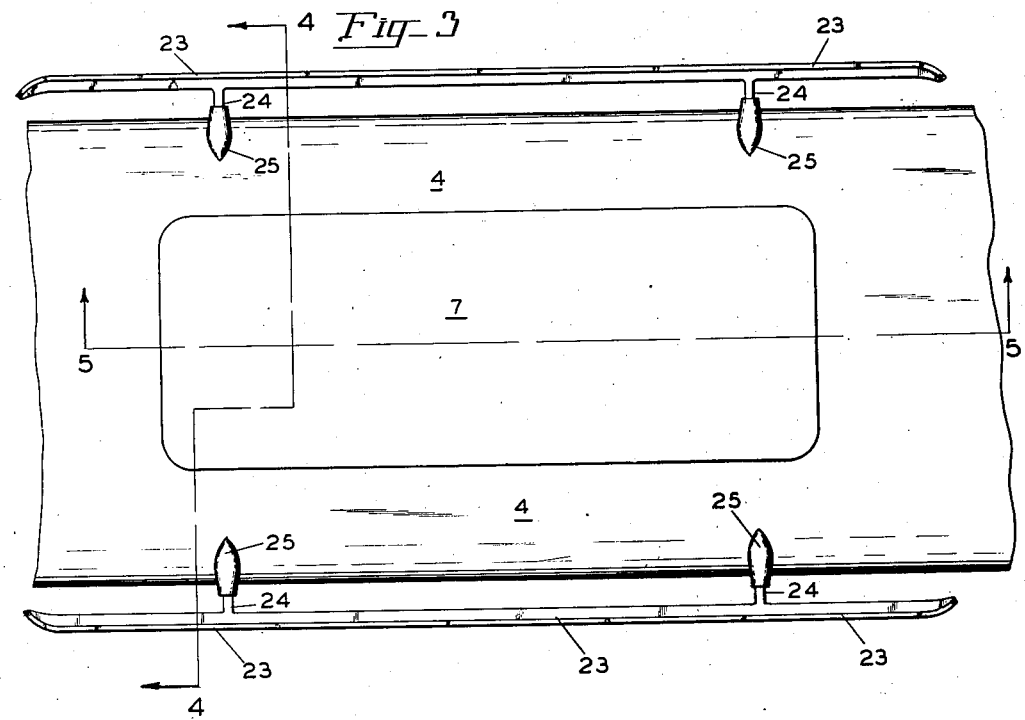
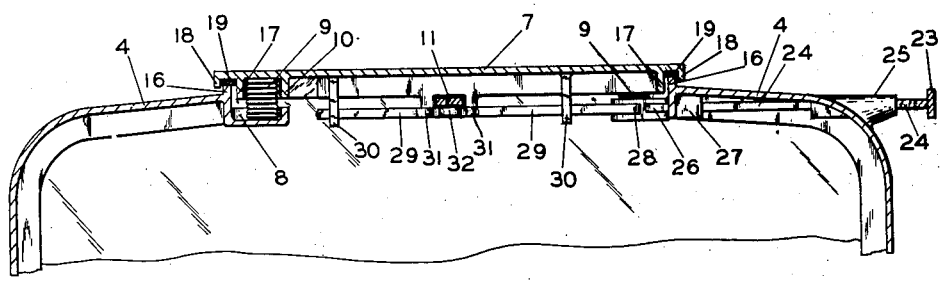
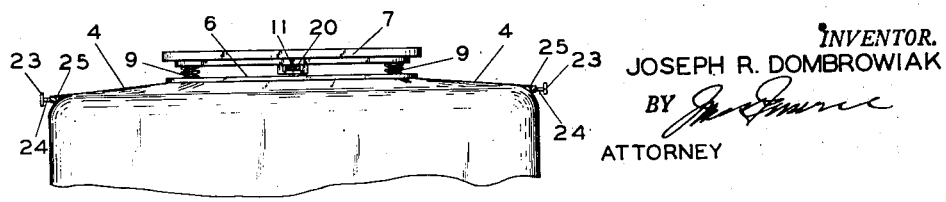
INVENTOR.
JOSEPH R. DOMBROWIAK
BY
ATTORNEY

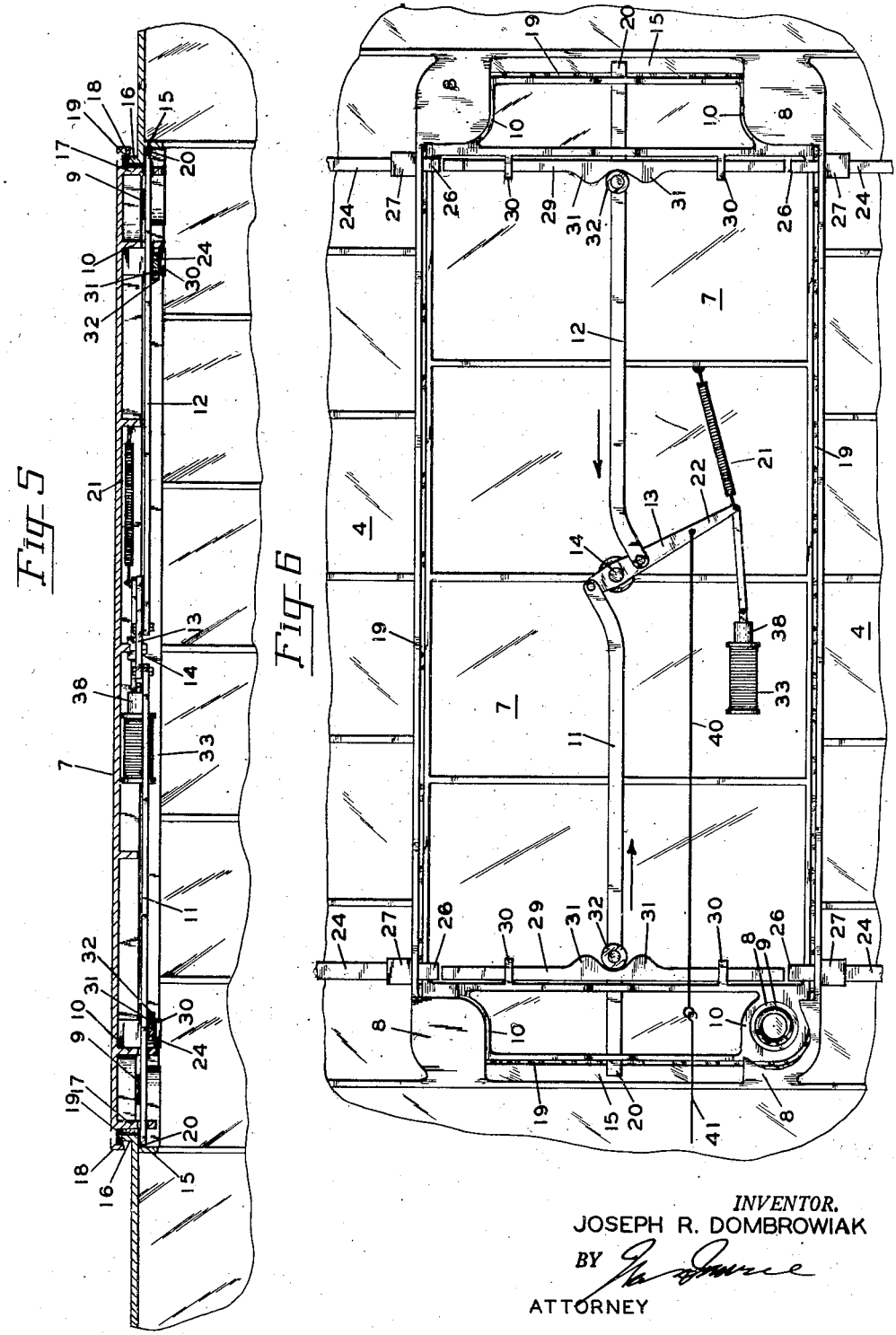

Patented May 3, 1949

2,469,159

UNITED STATES PATENT OFFICE 2,469,159

PASSENGER ESCAPE FOR VEHICLES

Joseph R. Dombrowiak, Portland, Oreg.

Application May 17, 1946, Serial No. 670,571

2 Claims. (Cl. 292—33)

This invention relates to passenger escapes for vehicles and is particularly adapted for busses, trains and the like.

The primary object of the invention is to provide escape openings in the bodies of vehicles whose doors or covers can be automatically released in the event of an accident. These escape doors or openings are preferably located on the top of the vehicle or on the rear, but I do not wish to be limited to any particular location.

A further object of the invention is to provide mechanical trip or release mechanism for releasing the covers covering the escape openings. These automatic release mechanisms can be operated when the vehicle turns over by direct contact with the ground, or they may be operated by mercury switches making contact when the vehicle is in an inverted position.

An a further object of the invention consists in having a suitable release, either automatic, manual or both when a vehicle is turned over or submerged under water.

These and other incidental objects will be apparent in the drawings, specification and claims.

Referring to the drawings:

Figure 3 is a fragmentary plan view of the vehicle illustrating the release bars and the escape door.

Figure 4 is a fragmentary end sectional view, taken on line 4—4 of Figure 3, illustrating the releasing and locking mechanism.

Figure 5 is a sectional view, taken on line 5—5 of Figure 3, illustrating the releasing and locking mechanism.

Figure 6 is an inverted plan view of the cover of the escape opening, illustrating the releasing and locking mechanism.

Figure 7 is a fragmentary view indicating the door having been released from the escape opening.

In the drawings:

Figure 1:
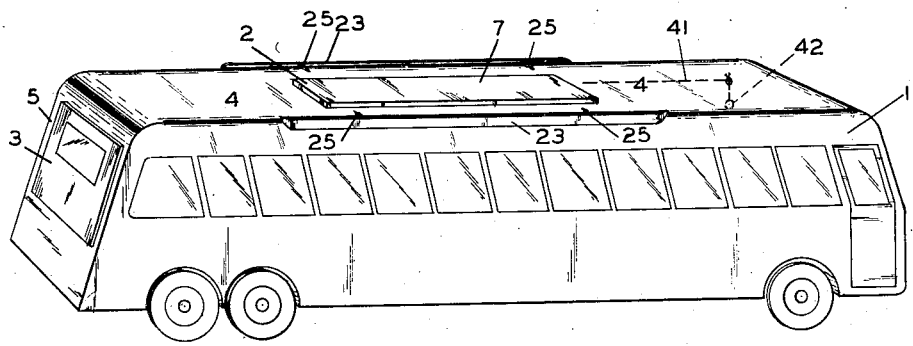
Figure 1 is a side perspective view of a vehicle commonly known as a stage or bus, illustrating my new and improved passenger escape located on the top and rear of the vehicle.
Figure 2:
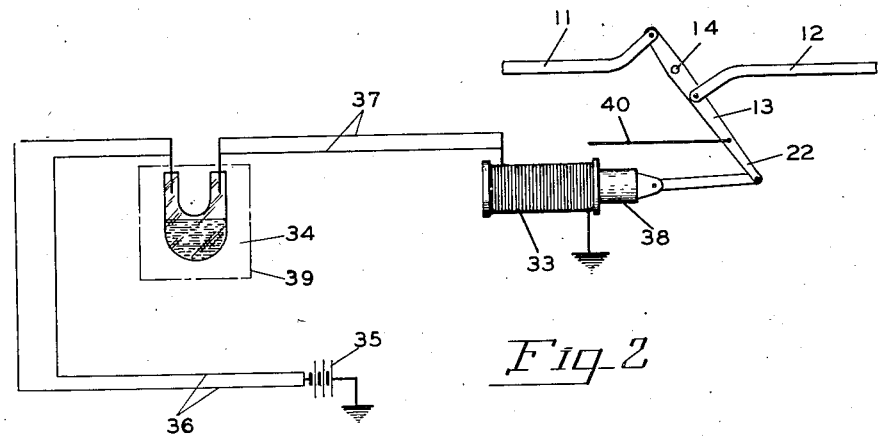
Figure 2 is a diagrammatical diagram illustrating the magnetic release mechanism for releasing the cover from the escape.

The vehicle is indicated at 1 having passenger release escapes 2 and 3. The escape 2 is located on the top 4 of the vehicle, while the escape 3 is located on the rear of the vehicle 5. Referring to Figure 7, the escape opening is indicated at 6. The door or cover having just been released is indicated at 7. In each corner of the opening 6 are located pockets 8 into which the springs 9 rest. Inverted brackets 10 are formed on the underside of the door 7 into which the spring nests, best illustrated in Figures 4 and 6. The objects of the springs are to force the door 7 away from the opening 6 when the locking mechanism releases the door, which I will now describe.

Locking bolts or rods 11 and 12 are pivotally connected to the bar 13 which in turn is pivotally connected to the underside of the door at 14. The opposite end of the bar engages the under surface 15 of the opening 6 which forms part of the top or body of the vehicle. When the door 7 is placed over the opening 6 and resting on the springs 9 it is forced downwardly over the upwardly extending flange 16 associated with the body of the vehicle.

The inside of the door 7 has a flange 17 which engages the inner side of the flange 16, guiding the door and keeping the same in alignment. A second or outer flange 18 is provided for preventing moisture from entering into the vehicle and a gasket 19 may also be provided, further preventing the moisture from entering through the door and the opening. When the door 7 is forced down upon the gasket 19, or to its full closed position, the ends 20 of the locking bolts 11 and 12 engage the underside 15 of the opening 6 holding the door securely in place. A spring 21 may be provided for pulling the lever 22 to the position shown in the drawing maintaining the locking bolts in locking position as above described.

I will now describe the method of unlocking and releasing the door. Rails 23 are secured to plungers 24 which pass through the top of the vehicle at 25, and have their inner ends 26 supported by the brackets 27 and laying adjacent the ends 28 of the bars 29. The bars 29 are mounted to the underside of the door by suitable guides 30, said bars 29 have cams 31 for cooperating with the roller 32 which is fixedly secured to the locking bolts 11 and 12.

I will now describe the operation of this particular unlocking mechanism. In the event the vehicle turns over the rails 23 will in most cases contact some object, forcing them towards the vehicle together with one or more of the plungers 24 in which event the bar 29 will be forced laterally of the vehicle causing one of the cams 31 to force the locking bolts in the direction of the arrows unlocking the ends 20 from under the ledge 15. This will allow the springs 9 to force the door 7 away from the opening 6 as illustrated in Figure 7.

I have provided a further automatic means of releasing the doors which may be used in combination with the above mechanism or used separately. A solenoid 33 is fixed mounted to the underside of the door 7 and in the event that the vehicle turns over a mercury switch 34 will close an electric circuit from the battery 35 through a multiple of conductors 36, the switch 34, conductor 37 and energize the solenoid 33 pulling its core 38, together with the lever 22 so as to unlock the bolts 11 and 12 as above described. The solenoid switch 34 may be mounted in a suitable protective case indicated by the broken lines 39 and as shown in the diagram one or more electric circuits 36 may lead from the battery through the switch to the solenoid to insure that the solenoid will be operated in case of injury to one of the lines.

I have also shown a manual means of operating the unlocking mechanism, a cable 40 may connect to the lever 22 and to the cable 41 leading to the operating handle 42 located adjacent the driver of the vehicle. By pulling this cable arrangement the driver could release the escape door. I have illustrated an escape door located in the rear of the vehicle, although I do not wish to be limited to the location of the escapes, but in the event the vehicle landed on its top this door would insure the free escape of the passengers.

I do not wish to be limited to the exact mechanical method of operating the escape door, as a number of mechanical equivalents or automatic devices may be substituted still coming within the scope of my claims.

I claim:

1. A passenger escape for motor vehicles, the vehicle being formed with an escape opening leading to the exterior of the vehicle, a closure for said opening, an outstanding flange on the vehicle surrounding the edge of the opening, a depending flange on the closure adjacent the outstanding flange, springs underlying the closure and bearing on the depending flange to be tensioned when the closure is in closed position and to exert an initial opening of the closure when free to act, a lever pivoted to the closure, locking rods carried by the closure, said locking rods having their inner ends pivoted to the lever, the outer ends of the locking rods underlying the edges of the walls of the escape opening, bars mounted to the underside of the closure and extending transverse the locking rods, means carried by the vehicle and operative under sufficient contact thereof externally of the vehicle to engage and operate the slidable bars, and cooperating means on the slidable bars, and locking rods to move said locking rods from the edges of the walls of the opening in operation of the slidable bars.

2. A construction as defined in claim 1, wherein the means to engage and operate the slidable bars includes plungers guided in the vehicle adjacent the escape opening and designed to be moved in the direction transverse the locking rods under predetermined contact therewith from outside the vehicle, cams on the slidable bar, and means on the locking rods to be engaged by said cams under plunger movement of the slidable rods to operate the locking rods to release the closure.

JOSEPH R. DOMBROWIAK.

REFERENCES CITED

The following references are of record in the file of this patent:

UNITED STATES PATENTS

| Number | Name | Date |
|---|---|---|
| 1,011,956 | Hild | Dec. 19, 1911 |
| 1,287,973 | Gruber | Dec. 17, 1918 |
| 1,300,899 | Wagner | Apr. 15, 1919 |
| 1,627,728 | Conklin | May 10, 1927 |
| 1,701,491 | Casey | Feb. 12, 1929 |
| 2,022,718 | Heins | Dec. 3, 1935 |
| 2,124,117 | Nichols | July 19, 1938 |
| 2,392,874 | Pelaez | Jan. 15, 1946 |